R. S. WEEHUNT.
VEHICLE FELLY AND TIRE HOLDER.
APPLICATION FILED OCT. 25, 1909.
981,507.
Patented Jan. 10, 1911.
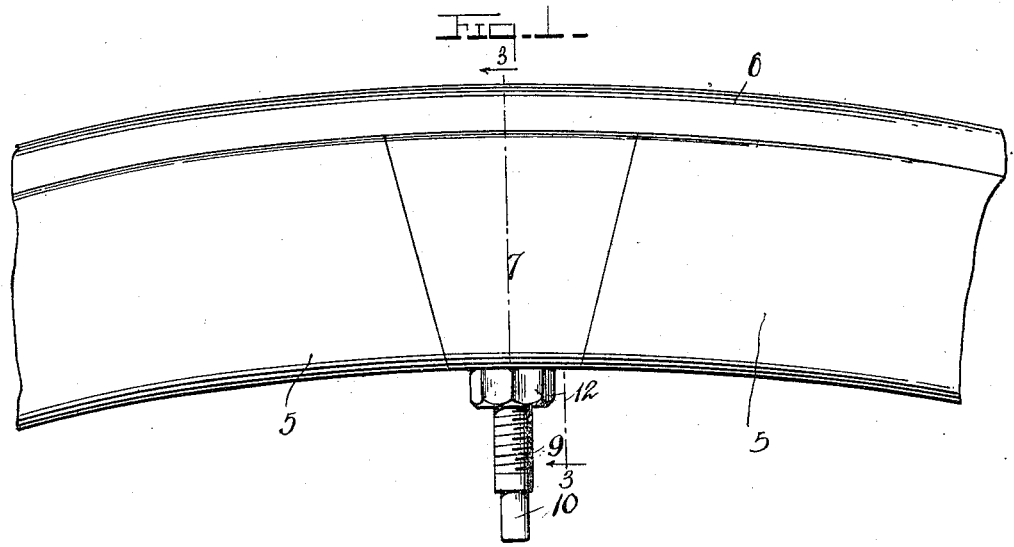
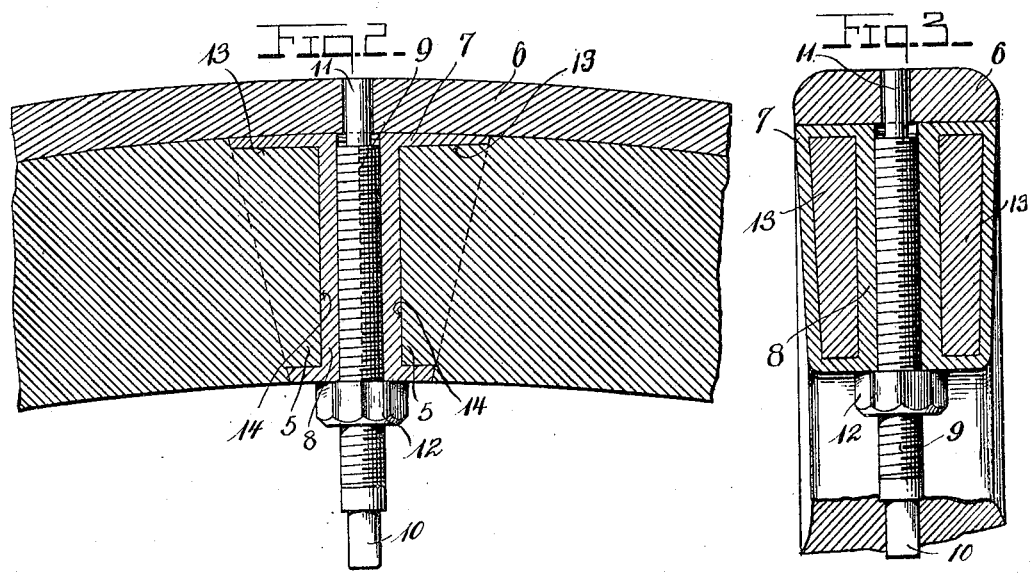
Inventor
Robert S. Weehunt
Witnesses
Ernest Crocker
By [signature]
Attorneys

UNITED STATES PATENT OFFICE.

ROBERT S. WEEHUNT, OF MORGAN, TEXAS.

VEHICLE FELLY AND TIRE HOLDER.

981,507. Specification of Letters Patent. Patented Jan. 10, 1911.

Application filed October 25, 1909. Serial No. 524,539.

*To all whom it may concern:*

Be it known that I, ROBERT S. WEEHUNT, a citizen of the United States, residing at Morgan, in the county of Bosque, State of Texas, have invented certain new and useful Improvements in Vehicle Felly and Tire Holders; and I do hereby declare the following to be a full, clear, and exact description of the invention, such as will enable others skilled in the art to which it appertains to make and use the same.

The invention relates to a vehicle tire and felly holder and more particularly to the class of devices for joining the meeting ends of a felly and also for securing the tire to the felly.

The primary object of the invention is the provision of a holder in which the meeting ends of a felly are adapted to fit for uniting the same and an adjustable screw for engaging a tire to hold the same upon the felly and to prevent creeping thereof, this adjustable screw being capable of separating the tire from the felly to permit the introduction of filling between the same should the occasion demand.

Another object of the invention is the provision of a device of this character which is simple of construction, readily and easily applied, thoroughly reliable and efficient in function and that can be manufactured at a minimum cost.

With these and other objects in view, the invention consists in the construction, combination and arrangement of parts, as will be hereinafter more fully described in detail, illustrated in the accompanying drawings, which disclose the preferred form of embodiment of the invention, to enable those skilled in the art to practice the same, and as pointed out in the claim hereunto appended.

In the drawings: Figure 1 is a fragmentary side elevation of a felly and tire with the invention applied thereto. Fig. 2 is a vertical sectional view of the same. Fig. 3 is a transverse sectional view on the line 3—3 of Fig. 1.

Similar reference characters indicate corresponding parts throughout the several views in the drawings.

Referring to the drawings by numerals 5 designates the adjacent or meeting ends of a vehicle wheel's felly and 6 the metal tire which is of the usual well known type. The tire and felly holder comprises a metal casting 7, in the form of a hollow sleeve of substantially wedge-shape and being of corresponding cross sectional contour as the felly ends. Centrally of this sleeve is formed an internally threaded tubular portion 8, in which is adjustably mounted a threaded screw member 9, the inner end of which is squared as at 10, to form a wrench engaging terminal while the opposite end of this member is reduced to form a stud terminal 11, the latter adapted to engage a suitable opening formed in the metal tire 6, to hold the latter against creeping upon the felly.

Carried by the threaded screw member 9, is a jam nut 12, which latter is adapted to lock the screw member in its adjusted position in the tubular portion 8 of the casting. The felly ends 5, are reduced as at 13 to fit snugly within opposite sides of the sleeve and the terminals or extreme ends thereof are formed with semi-circular recesses 14, to receive the tubular portion 8, of the casting.

It is obvious that by adjusting the screw member 9, the required distance it will cause the separation of the tire 6, a distance from the periphery of the felly so as to permit the introduction of filling between said tire and felly, should the occasion demand.

What is claimed is:—

In combination with a felly having its confronting ends bifurcated, a holder having a central tubular and internal screw threaded portion and wedge shaped sockets, the bifurcated felly ends being disposed in the wedge-shaped sockets and fitting against the inner wall surfaces of said sockets and abutting snugly against the tubular portion of said holder, said wall surfaces being squared, a tire mounted on the felly having an opening registering with the bore of the central tubular portion, a screw threaded in said tubular portion and formed with an unthreaded and reduced extension disposed in the tire opening and a lock nut threaded on the screw against the holder, the outer surface of said holder being flush with the outer surface of the felly ends.

In testimony whereof, I affix my signature, in presence of two witnesses.

ROBERT S. WEEHUNT.

Witnesses:
J. D. CATE,
S. J. COVEY.